United States Patent
Chen et al.

(10) Patent No.: US 11,599,882 B2
(45) Date of Patent: Mar. 7, 2023

(54) DATA PROCESSING METHOD, APPARATUS, AND SYSTEM

(71) Applicant: CHINA UNIONPAY CO., LTD., Shanghai (CN)

(72) Inventors: Yu Chen, Shanghai (CN); Jien Zhou, Shanghai (CN); Yimeng Lv, Shanghai (CN); Lei He, Shanghai (CN); Yuan Gao, Shanghai (CN); Yisheng Fu, Shanghai (CN); Xiufeng Hu, Shanghai (CN); Longchao Li, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/624,983

(22) PCT Filed: Jul. 20, 2020

(86) PCT No.: PCT/CN2020/103112
§ 371 (c)(1),
(2) Date: Jan. 5, 2022

(87) PCT Pub. No.: WO2021/135170
PCT Pub. Date: Jul. 8, 2021

(65) Prior Publication Data
US 2022/0292514 A1 Sep. 15, 2022

(30) Foreign Application Priority Data
Dec. 31, 2019 (CN) .......................... 201911419394.3

(51) Int. Cl.
*G06Q 20/40* (2012.01)
*G06Q 20/34* (2012.01)
(Continued)

(52) U.S. Cl.
CPC ..... *G06Q 20/40145* (2013.01); *G06Q 20/341* (2013.01); *G06Q 20/3823* (2013.01);
(Continued)

(58) Field of Classification Search
None
See application file for complete search history.

(56) References Cited

U.S. PATENT DOCUMENTS

2016/0112415 A1* 4/2016 Park ................. H04L 63/0861
713/186
2017/0017957 A1 1/2017 Radu

FOREIGN PATENT DOCUMENTS

| CN | 109711133 A | 5/2019 |
| CN | 110189136 A | 8/2019 |
| CN | 111144895 A | 5/2020 |

OTHER PUBLICATIONS

International Search Report for corresponding Application No. PCT/CN2020/103112, dated Oct. 21, 2020.
(Continued)

*Primary Examiner* — Scott S Trotter
*Assistant Examiner* — Amit Patel
(74) *Attorney, Agent, or Firm* — Renner, Otto, Boisselle & Sklar, LLP

(57) ABSTRACT

A data processing method, apparatus and system, for improving the security and accuracy in the data processing process. The method comprises: receiving target biometric information and verification password information of a target object sent by an acquisition institution server; recognizing, from registered biometric information of a plurality of objects, the registered biometric information matching the target biometric information; determining target account information of the target object according to the recognized registered biometric information; and sending a data processing request to a card issuing institution server corre-
(Continued)

sponding to the target account information, the data processing request comprising the target account information and the verification password information, so that the card issuing institution server performs verification using the verification password information and performs data processing according to the target account information after the verification is passed.

16 Claims, 7 Drawing Sheets

(51) Int. Cl.
    *G06Q 20/38*     (2012.01)
    *H04L 9/40*     (2022.01)
(52) U.S. Cl.
    CPC ..... *G06Q 20/3825* (2013.01); *H04L 63/0428* (2013.01); *H04L 63/083* (2013.01); *H04L 63/0807* (2013.01); *H04L 63/0861* (2013.01)

(56) References Cited

OTHER PUBLICATIONS

Written Opinion for corresponding Application No. PCT/CN2020/103112, dated Oct. 21, 2020.

\* cited by examiner

DATA PROCESSING METHOD, APPARATUS, AND SYSTEM

CROSS REFERENCE TO RELATED APPLICATIONS

The present application is the National Stage of International Application No. PCT/CN2020/103112, filed on Jul. 20, 2020, which claims the priority of Chinese Patent Application No. 201911419394.3, filed with the China National Intellectual Property Administration on Dec. 31, 2019 and entitled "data processing method, apparatus, and system", the entire contents of which are incorporated herein by reference.

FIELD

The present disclosure relates to the technical field of data processing, in particular to a data processing method, apparatus and system.

BACKGROUND

In recent years, a biometric recognition technology in the field of artificial intelligence has permeated into our daily lives. Face recognition has the advantages of fast recognition, high accuracy, high equipment popularizing rate and the like, thereby gradually becoming a top spot in biometric recognition. Application and development of deep learning make a face recognition pass rate increase remarkably. Taking face recognition of 1:N (N is 500) for example, in a case of a recognition error rate being one ten-thousandth, the face recognition pass rate can reach above 98.3%, which has reached a financial application level. On this basis, a third-party payment company, a banking sector and the like have started to apply face recognition to scenes of payment, cash withdrawal and the like.

At present, biometric recognition is performed usually in a mode of 1:1 comparison. For example, when a user pays for something, an acceptance terminal can collect face information and a mobile phone number of the user, finds face information input by the user during registration through the mobile phone number, performs comparison verification between the face information of the user collected this time and the face information input by the user during registration and judges whether it is the same face, and payment can be performed with a bonding bank card of the user if the verification is passed.

It can be seen from this that security and accuracy need to be further improved if user identity verification is performed only with biometrics in a biometric recognition process in the prior art.

SUMMARY

The present disclosure provides a data processing method, apparatus and system for improving security and accuracy in a data processing process.

In a first aspect, the present disclosure provides a data processing method, including:

receiving target biometric information and verification password information of a target object sent by an acquirer server;

recognizing matched registered biometric information, matched with the target biometric information, from registered biometric information of a plurality of objects, wherein registered biometric information of any of the objects and registered account information of the any object are associatively stored;

determining target account information of the target object according to the matched registered biometric information; and sending a data processing request to a card issuer server corresponding to the target account information, wherein the data processing request includes the target account information and the verification password information, so that the card issuer server performs verification through the verification password information and performs data processing according to the target account information after the verification is passed.

In an optional embodiment, the recognizing the matched registered biometric information, matched with the target biometric information, from the registered biometric information of the plurality of objects includes:

determining partition biometric information from the registered biometric information of the plurality of objects, wherein the partition biometric information is registered biometric information stored in association with the verification password information;

determining a main recognition algorithm and an auxiliary recognition algorithm corresponding to the verification password information;

recognizing the matched registered biometric information, matched with the target biometric information, from the partition biometric information corresponding to the verification password information through the main recognition algorithm; and verifying a recognition result of the main recognition algorithm through the auxiliary recognition algorithm.

In an optional embodiment, the recognizing the matched registered biometric information, matched with the target biometric information, from the partition biometric information includes:

comparing an information quantity of the partition biometric information with a quantity threshold value;

recognizing the matched registered biometric information, matched with the target biometric information, from the partition biometric information when the information quantity is smaller than the quantity threshold value; and selecting out sub-partition biometric information from the partition biometric information through an algorithm when the information quantity is larger than or equal to the quantity threshold value, and recognizing the matched registered biometric information, matched with the target biometric information, from the sub-partition biometric information.

In an optional embodiment, the method further includes:

sending a recognition failure response to a terminal through the acquirer server when it fails to recognize the matched registered biometric information, matched with the target biometric information from the sub-partition biometric information, so that the terminal displays a prompt of inputting auxiliary recognition information;

receiving the auxiliary recognition information forwarded by the acquirer server, wherein the auxiliary recognition information is sent by the terminal to the acquirer server in response to operation of a user;

determining registered biometric information corresponding to the auxiliary recognition information from the sub-partition biometric information; and recognizing the matched registered biometric information, matched with the target biometric information, from the registered biometric information corresponding to the auxiliary recognition information.

In an optional embodiment, before sending the data processing request to the card issuer server corresponding to the target account information, the method further includes:

sending the target account information to the terminal through the acquirer server, so that the terminal sends the data processing request to the acquirer server, wherein the data processing request includes the target account information and the verification password information; and receiving the data processing request forwarded by the acquirer server.

In an optional embodiment, before receiving the target biometric information and the verification password information of the target object, the method further includes:

receiving registered account information, registered biometric information and routing index information of the target object, wherein the routing index information is generated by operating the verification password information through an irreversible algorithm;

performing salt encryption processing on the routing index information; and storing encrypted routing index information, the registered biometric information and the registered account information of the target object associatively.

In an optional embodiment, the storing the encrypted routing index information, the registered biometric information and the registered account information of the target object associatively includes:

performing tokenization processing on the registered account information of the target object so as to obtain Tokend information of the target object; and storing the encrypted routing index information, the registered biometric information and the Tokend information of the target object associatively.

The determining the target account information of the target object includes:

determining Tokend information corresponding to the target biometric information; and converting the Tokend information corresponding to the target biometric information into Tokent information.

After determining the target account information of the target object, the method further includes:

sending the Tokent information to the terminal.

In an optional embodiment, the biometric information includes one or a plurality of the following listed items:

face information, fingerprint information, vocal print information, iris information, palm print information, finger vein information or palm vein information.

In a second aspect, the present disclosure provides a data processing apparatus, including:

a transceiving component, configured to receive target biometric information and verification password information of a target object sent by an acquirer server;

a recognition component, configured to recognize matched registered biometric information, matched with the target biometric information, from registered biometric information of a plurality of objects, wherein registered biometric information of any of the objects and registered account information of the any object are stored associatively; and a determining component, configured to determine target account information of the target object according to the matched recognized registered biometric information.

The transceiving component is further configured to send a data processing request to a card issuer server corresponding to the target account information, wherein the data processing request includes the target account information and the verification password information, so that the card issuer server performs verification through the verification password information and performs data processing according to the target account information after the verification is passed.

In an optional embodiment, the recognition component is configured to:

determine partition biometric information from the registered biometric information of the plurality of objects, wherein the partition biometric information is registered biometric information stored in association with the verification password information;

determine a main recognition algorithm and an auxiliary recognition algorithm corresponding to the verification password information;

recognize the matched registered biometric information, matched with the target biometric information, from the partition biometric information corresponding to the verification password information through the main recognition algorithm; and verify a recognition result of the main recognition algorithm through the auxiliary recognition algorithm.

In an optional embodiment, the recognition component is configured to:

compare an information quantity of the partition biometric information with a quantity threshold value;

recognize the matched registered biometric information, matched with the target biometric information, from the partition biometric information when the information quantity is smaller than the quantity threshold value; and select out sub-partition biometric information from the partition biometric information through an algorithm when the information quantity is larger than or equal to the quantity threshold value, and recognize the matched registered biometric information, matched with the target biometric information, from the sub-partition biometric information.

In an optional embodiment, the transceiving component is further configured to send a recognition failure response to a terminal through the acquirer server when it fails to recognize the matched registered biometric information, matched with the target biometric information from the sub-partition biometric information, so that the terminal displays a prompt of inputting auxiliary recognition information; receive the auxiliary recognition information forwarded by the acquirer server, wherein the auxiliary recognition information is sent by the terminal to the acquirer server in response to operation of a user.

The recognition component is further configured to determine registered biometric information corresponding to the auxiliary recognition information from the sub-partition biometric information; and recognize the matched registered biometric information, matched with the target biometric information, from the registered biometric information corresponding to the auxiliary recognition information.

In an optional embodiment, the transceiving component is further configured to:

send the target account information to the terminal through the acquirer server, so that the terminal sends the data processing request to the acquirer server, wherein the data processing request includes the target account information and the verification password information; and receive the data processing request forwarded by the acquirer server.

In an optional embodiment, the apparatus further includes a registration component, which is configured to:

receive registered account information, registered biometric information and routing index information of the target object, wherein the routing index information is generated by operating the verification password information through an irreversible algorithm;

perform salt encryption processing on the routing index information; and store encrypted routing index information, the registered biometric information and the registered account information of the target object associatively.

In an optional embodiment, the registration component is configured to perform tokenization processing on the registered account information of the target object so as to obtain Tokend information of the target object; and store the encrypted routing index information, the registered biometric information and the Tokend information of the target object associatively.

The determining component is further configured to determine Tokend information corresponding to the target biometric information; and convert the Tokend information corresponding to the target biometric information into Tokent information.

The transceiving component is further configured to send the Tokent information to the terminal.

In an optional embodiment, the biometric information includes one or a plurality of the following listed items:

face information, fingerprint information, vocal print information, iris information, palm print information, finger vein information or palm vein information.

In a third aspect, the present disclosure further provides an electronic device, including:

at least one processor; and a memory in communication connection with the at least one processor.

The memory stores an instruction capable of being executed by the at least one processor, and the instruction is executed by the at least one processor, so that the above method may be executed by the at least one processor.

In a fourth aspect, the present disclosure further provides a non-transitory computer readable storage medium, storing computer instructions, wherein the computer instructions are configured to make a computer execute the above method.

In a fifth aspect, the present disclosure further provides a data processing system, including an acquirer server, a biometric recognition server and a card issuer server.

The acquirer server is configured to receive target biometric information and verification password information of a target object sent by a terminal; and send the target biometric information and the verification password information to the biometric recognition server.

The biometric recognition server is configured to receive the target biometric information and the verification password information sent by the acquirer server; recognize matched registered biometric information, matched with the target biometric information, from registered biometric information of a plurality of objects, wherein registered biometric information of any of the object and registered account information of the any object are stored associatively, determine target account information of the target object according to the matched registered biometric information; and send a data processing request to the card issuer server corresponding to the target account information, wherein the data processing request includes the target account information and the verification password information.

The card issuer server is configured to receive the data processing request; and perform verification through the verification password information and perform data processing according to the target account information after the verification is passed.

In the present disclosure, an acquirer server receives target biometric information and verification password information sent by an acceptance terminal and then forwards the target biometric information and the verification password information to an biometric recognition server. The biometric recognition server recognizes matched registered biometric information, matched with the target biometric information, from stored registered biometric information of a plurality of objects, and determines target account information of the target object according to the matched registered biometric information. Then the biometric recognition server sends a data processing request to a card issuer server corresponding to the target account information. The data processing request includes the target account information and the verification password information. The card issuer server performs verification through the verification password information and performs data processing according to the target account information after the verification is passed.

In the above solutions, the target biometric information is used to find out registered biometric information of the target object from registered biometric information of the plurality of objects so as to further determine the registered target account information of the target object, and thus the target biometric information actually serves as a route identification and may play a role in routing index of the registered account information. Besides, in a process of searching the registered target account information of the target object through the target biometric information, comparison with the registered biometric information of the plurality of objects is needed, so that the solutions actually also include a process of verifying the target biometric information. Moreover, the solutions verify the target object by using not only the target biometric information, but also the verification password information, and password verification and biometric recognition are combined so as to widen an application range and help improve data accuracy and security. Furthermore, the solutions may further establish an interconnection and intercommunication data processing security system, thereby helping realize algorithm intercommunication and breaking isolation of biometric recognition among different mechanisms.

BRIEF DESCRIPTION OF THE DRAWINGS

In order to describe technical solutions in embodiments of the present disclosure more clearly, accompanying drawings needed in description of the embodiments will be briefly introduced below. It is apparent that the drawings in the following description are only for illustrating some embodiments of the present disclosure, and those ordinarily skilled in the art can obtain other drawings according to these drawings without creative work.

DETAILED DESCRIPTION OF THE EMBODIMENTS

In order to make the objectives, the technical solutions and the advantages of the present disclosure clearer, the present disclosure will be further described in detail below in conjunction with accompanying drawings. Apparently, described embodiments are only some but not all of the embodiments of the present disclosure. On the basis of the embodiments in the present disclosure, all other embodiments obtained by those ordinarily skilled in the art without creative work belong to the protection scope of the present disclosure.

Figure 1:
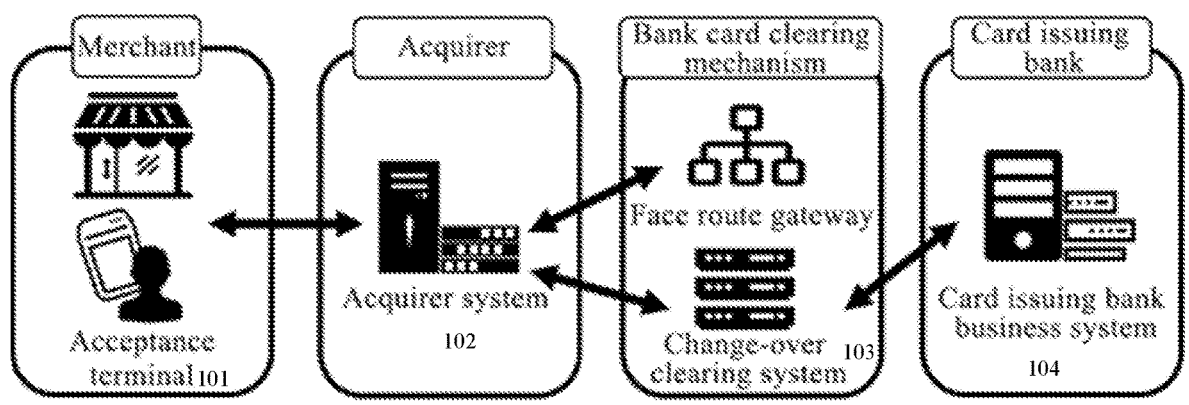
FIG. 1 is an architecture diagram of a data processing system provided by an embodiment of the present disclosure.

Please refer to FIG. 1, which shows a system architecture diagram of a data processing system provided by an embodiment of the present application. The data processing system includes an acceptance terminal 101, an acquirer system 102, a clearing system (namely, a change-over clearing system) 103 and a card issuing system (namely, a card issuing banking business system) 104. The acceptance terminal 101 is installed by the acquirer system 102 for a specially engaged merchant and may be a point of sale (POS) machine, a swipe card reader, etc. The clearing system 103 includes a biometric recognition module which may be integrated into a clearing system server or may be an independent server.

The acquirer system 102 and/or the clearing system 103 and/or the card issuing system 104 may be network device(s) such as computer (s). The acquirer system 102 and/or the clearing system 103 and/or the card issuing system 104 may be independent device(s) or server cluster(s) composed of a plurality of servers. Preferably, the acquirer system 102 and/or the clearing system 103 and/or the card issuing system 104 may perform information processing through a cloud computing technology.

The acceptance terminal 101 and the acquirer system 102, and/or the acquirer system 102 and the clearing system 103, and/or the clearing system 103 and the card issuing system 104 are connected through wired network(s) or wireless network(s).

Optionally, the wireless network or wired network adopts a standard communication technology and/or protocol. The network is usually the Internet or any other networks and includes but is not limited to one or a combination of a local area network (LAN), a metropolitan area network (MAN), a wide area network (WAN), a mobile network, the wired or wireless network, a private network, or a virtual private network. In some embodiments, technologies and/or formats including a hyper text mark-up language (HTML), an extensible markup language (XML) and the like are used for representing data exchanged through a network. Besides, a conventional encryption technology such as a secure socket layer (SSL), a transport layer security (TLS), a virtual private network (VPN), an internet protocol security (IPsec) and the like may be used for encrypting all or some of links. In some other embodiments, a custom-made and/or private data communication technology may be used for replacing or supplementing the above data communication technology.

It needs to be noted that the above application scenes are only shown for conveniently understanding the spirit and a principle of the present application and do not limit the embodiments of the present application at all in this aspect. Rather, the embodiments of the present application may be applied to any suitable scenes.

In the prior art, a system for transaction payment through a biometric recognition technology is usually in a three-party mode, namely, including the acceptance terminal of a merchant, the acquirer system and the card issuing banking business system. The acquirer system forwards biometric information collected by the acceptance terminal to the card issuing banking business system. The card issuing banking business system compares the received biometric information with stored biometric information. Ut is assured that an initiator of the transaction payment and a registrant are the same user if the received biometric information is matched with the stored biometric information, and the transaction payment is allowed. In this manner, the biometric information is similar to a traditional verification password and is identified in 1:1 as a verification identification. As for a card issuing bank, a payment application based on the biometric recognition technology it supports is closed, and networking usage is not allowed between different banks. Moreover, only using the biometric information as the verification identification causes low security and accuracy of verification, and the security and the accuracy need to be further improved.

Figure 2:
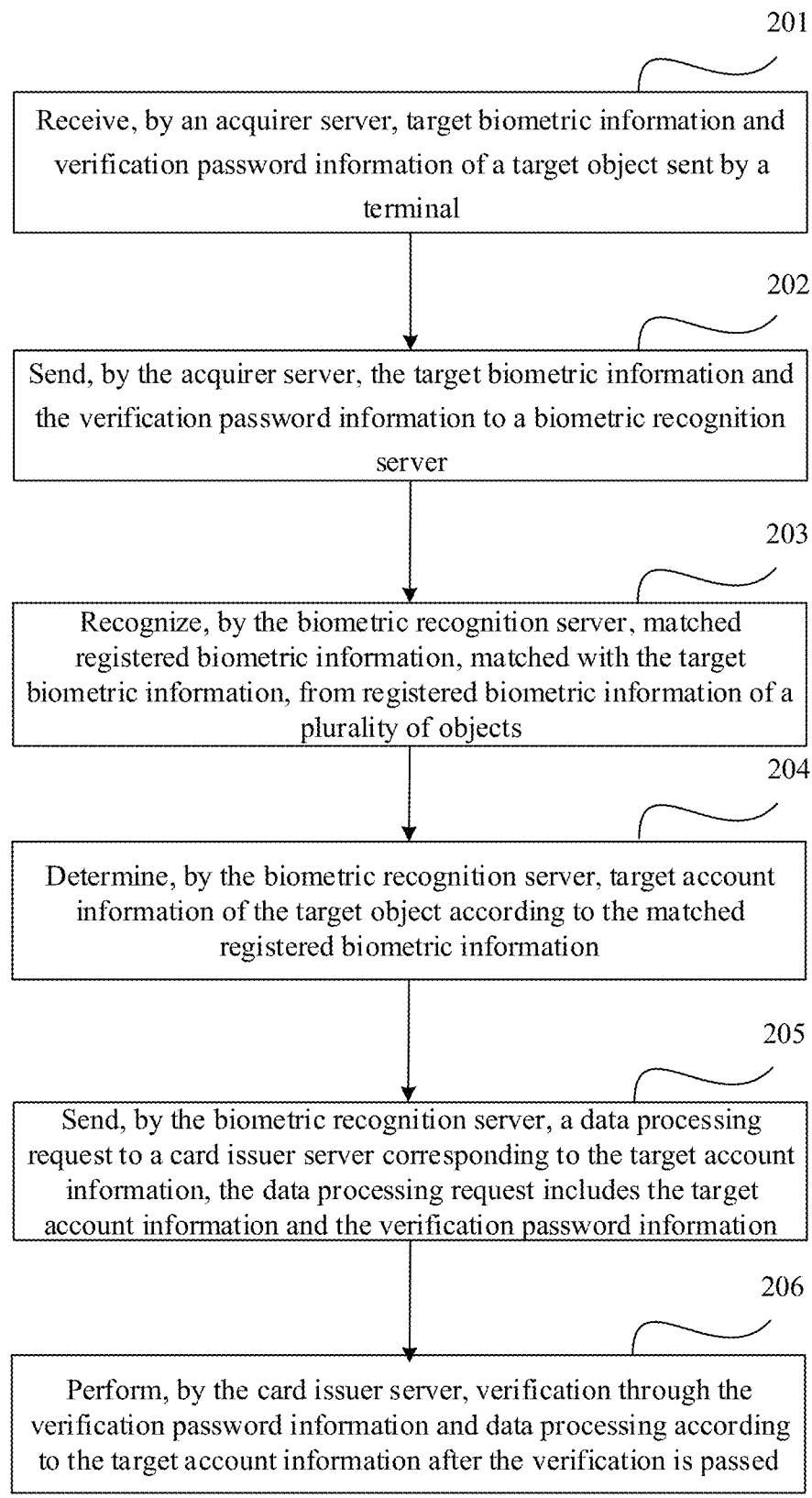
FIG. 2 is a schematic flow chart of a data processing method provided by an embodiment of the present disclosure.

In order to solve the above problems, on the basis of the data processing system shown in FIG. 1, an embodiment of the present disclosure provides a data processing method, as shown in FIG. 2, including the following operations.

Operation 201, an acquirer server receives target biometric information and verification password information of a target object sent by a terminal.

During implementations, the terminal here is usually an acceptance terminal such as a POS machine, a swipe card reader and the like arranged in a merchant. A client supported by an acquirer is installed in the acceptance terminal and may establish a secure communication link with the acquirer server. A biometric feature collection module such as a camera and a FingerReader is integrated into the acceptance terminal for collecting biometric information of a user. The verification password information may be a payment password input by the user during payment, and the payment password may be character type data of numbers, letters or combination of the numbers and letters or the other types of data.

Exemplarily, when the user is in transaction payment, the acceptance terminal may display prompt information to the user to prompt the user to input the biometric information and the verification password information.

Operation 202, the acquirer server sends the target biometric information and the verification password information to a biometric recognition server.

Operation 203, the biometric recognition server recognizes registered biometric information matched with the target biometric information from registered biometric information of a plurality of objects. The registered biometric information and account information of the same object are stored associatively.

During implementations, the registered biometric information is stored in a biometric database. The biometric database may be integrated into the biometric recognition server or may be an independent device. The biometric recognition server may establish a link with the database in the independent device, so as to obtain data therein. The registered biometric information pre-stored in the biometric database may be biometric information input by user(s) when the user(s) register in a card issuer through an APP supported by the card issuer. A card issuer server is connected with the biometric database, and thus registration information is synchronized into the biometric database. In another possible embodiment, the user(s) may also register through an APP supported by a clearing mechanism, so that the biometric recognition server may directly obtain the registration information of the user(s). The registration information includes the biometric information of the user(s). Then, a clearing mechanism server synchronizes the registration information into the card issuer server.

Exemplarily, the biometric database may be connected with servers of a plurality of card issuers, namely, the biometric database stores registered biometric information of the plurality of card issuers, and each piece of registered biometric information corresponds to one user.

In embodiments of the present disclosure, the biometric recognition server may compare the received target biometric information with registered biometric information of multiple uses stored in the database according to an algorithm model. It means that the target biometric information and the matched registered biometric information are biometric information of the same user if the matched biometric information matched with the target biometric information is recognized. Thus, the target biometric information in embodiments of the present disclosure may play a role in route recognition as well as verification of a user identity.

Operation 204, the biometric recognition server determines target account information of the target object according to the matched registered biometric information.

During implementations, the biometric database stores not only the registered biometric information of users, but also registered account information of the users, the registered biometric information and the registered account information of the same user are stored associatively. The registered account information here includes bank card Token information, mobile phone identification information, bank card identification information and the like of the users. Account information and biometric information of the same user are stored associatively. The biometric recognition server recognizes the registered biometric information matched with the target biometric information, then the registered account information, namely the target account information, of the user may be determined according to the association.

Operation 205, the biometric recognition server sends the data processing request to the card issuer server corresponding to the target account information. The data processing request includes the target account information and the verification password information.

During implementations, the biometric recognition server may determine the card issuer server corresponding to the target account information after obtaining the target account information and send the data processing request to the card issuer server. The data processing request may be generated and sent by the biometric recognition server. Alternatively, the data processing request may be sent by the acceptance terminal through the acquirer server and received by the biometric recognition server, and in this case, the data processing request is generated by the acceptance terminal according to the target account information fed back by the biometric recognition server.

Operation 206, the card issuer server performs verification through the verification password information and performs data processing according to the target account information after the verification is passed.

During implementations, the card issuer server verifies the user identity according to the received verification password information and performs data processing after the verification is passed. As the card issuer server does not need to identify the biometric information of the user, the card issuer server may not need to be provided with a module based on a biometric recognition technology. The card issuer server directly verifies the verification password information, and a biometric recognition process is executed by the biometric recognition server. Therefore, a requirement for the card issuer server connected into the system is low, namely, when the card issuer server requires to be added into the system, the module related to the biometric recognition is not needed to be provided within the card issuer server. Furthermore, card issuer servers supporting different biometric recognition technologies may be connected into the data processing system in the embodiments of the present disclosure, and this manner breaks isolation between different algorithms so as to achieve the purpose of networking usage.

In embodiments of the present disclosure, the target biometric information is used for finding out the registered biometric information of the target object from the registered biometric information of the plurality of objects, and then the target account information of the target object is determined. In this manner, the target biometric information actually serves as a route identification and plays a role in routing index of the account information. Besides, in a process of searching the corresponding target account information through the target biometric information, comparison with registered biometric information of a plurality of users is needed, so that this manner also includes a process of verifying the target biometric information. Moreover, this manner verifies the target object by using not only the target biometric information, but also the verification password information, and password verification and biometric recognition are combined so as to widen an application range and help improve data accuracy and security. Furthermore, a data processing security system in the embodiments of the present disclosure is in interconnection and intercommunication, algorithm intercommunication may be realized, and isolation of biometric recognition among different mechanisms is broken.

In embodiments of the present disclosure, as the biometric database may be connected with a plurality of card issuer servers, the biometric database may store user information of the plurality of card issuers, and in this case, the quantity of the registered biometric information stored in the biometric database is quite huge. Therefore, if the registered biometric information matched with the target biometric information is recognized directly from massive data, on the one hand, a computation amount is huge, and on the other hand, the accuracy of a recognition result is possible low. In order to solve the problem, in an optional embodiment, a recognition range of the target biometric information may be narrowed down through the verification password information. Namely, in step 202, the recognizing the matched registered biometric information, matched with the target biometric information, from the registered biometric information of the plurality of objects may include the following operations.

Partition biometric information is determined from the registered biometric information of the plurality of objects. The partition biometric information is registered biometric information stored in association with the verification password information.

A main recognition algorithm and an auxiliary recognition algorithm corresponding to the verification password information are determined.

The registered biometric information matched with the target biometric information is recognized from all partition biometric information corresponding to the verification password information through the main recognition algorithm.

A recognition result of the main recognition algorithm is verified through the auxiliary recognition algorithm.

During implementations, the partition biometric information does not mean that the registered biometric information must be stored in a partition manner but means that the registered biometric information is stored in association with the verification password information. Namely, the registered biometric information may be stored either in a partition manner or not. In an optional implementation, the registered biometric information is stored in a hard disk not in a partition manner but is stored in redis in a partition manner after being read into the redis. A partition manner is that partition is performed according to the corresponding verification password information. As the quantity of the registered biometric information is large, as for simple verification password information, a plurality of registered biometric information possibly corresponds to the same verification password information. For example, a payment password of a bank card is usually six digits, as for the same number arrangement and combination, e.g., 123456, M users possibly select 123456 as a payment password input during their registration, and the payment password 123456 may correspond to M pieces of biometric information. If N pieces of registered biometric information are stored in the biometric database in total, indexing is performed through the verification password information, the N pieces of registered biometric information may be divided into a plurality of subsets, each subset includes multiple pieces of registered biometric information, and registered biometric information in the same subset corresponds to one piece of verification password information.

In this way, during payment transaction, the biometric recognition server receives the payment password 123456 of the user. The M partition biometric information corresponding to the payment password 123456 is determined from the N registered biometric information in the biometric database. The M partition biometric information is respectively compared with the target biometric information, and then registered biometric information matched with the target biometric information is determined from the M partition biometric information. In this process, the quantity of the registered biometric information compared with the target biometric information is reduced from N to M, so that the recognition computation amount may be reduced greatly, and the recognition success rate and accuracy are improved.

Biometric recognition is performed through an algorithm in the above embodiments, and what specific kind of an algorithm is not limited. During implementations, a multi-algorithm platform may be provided, and a unified recognition interface may be provided for calling of an upper layer. The multi-algorithm platform is provided with various recognition algorithms. As for partition biometric information corresponding to different verification password information, different recognition algorithms may be selected for recognition computation. As for partition biometric information corresponding to one verification password information, one main recognition algorithm and one auxiliary recognition algorithm may be selected, so that a more accurate recognition result may be provided. When one verification password information is obtained, the main recognition algorithm and the auxiliary recognition algorithm configured in the partition biometric information corresponding to the obtained verification password information are determined. Then recognition computation of 1:M is performed on the partition biometric information through the main recognition algorithm, and the registered biometric information matched with the target biometric information is recognized from the partition biometric information. After a recognition result is obtained, recognition verification is performed between the obtained recognition result and the target biometric information through the auxiliary recognition algorithm so as to judge the accuracy of the result. If it is inconsistent between the recognition result and the recognition verification result, the registered biometric information recognized by the main recognition algorithm (i.e., the recognition result) may be still used as a final recognition result, but the inconsistent result needs to be recorded, and an response of the inconsistent result is fed back to the acceptance terminal.

Optionally, a recognition error rate of the main recognition algorithm may be analyzed according to a situation of the inconsistent result recorded in a historical period, so that an algorithm with the smaller error rate and better effects may be selected subsequently as the main recognition algorithm.

Figure 3:
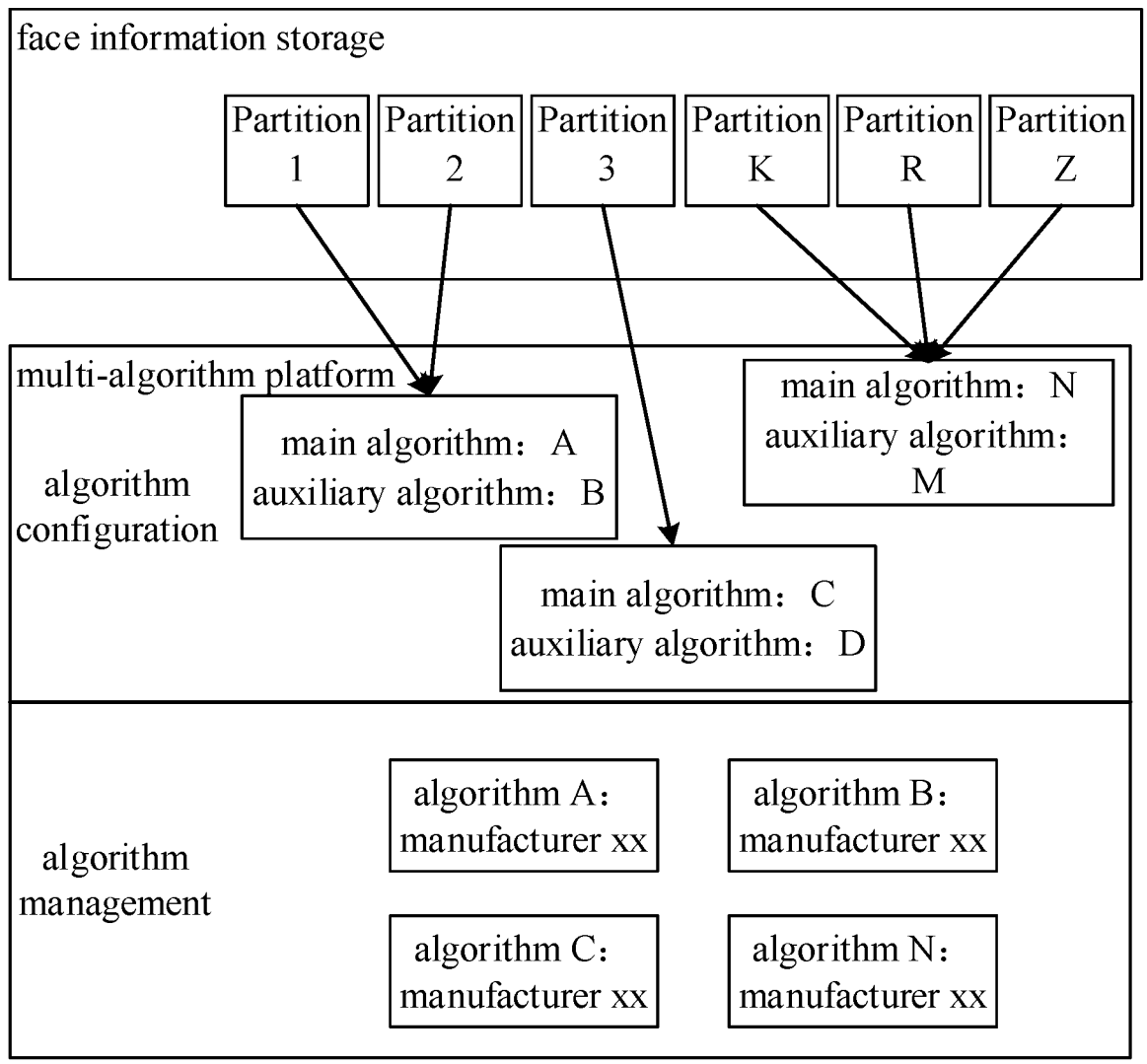
FIG. 3 is a schematic diagram of a multi-algorithm platform provided by an embodiment of the present disclosure.

FIG. 3 illustrates a schematic diagram of a multi-algorithm platform provided by an embodiment of the present disclosure. As shown in FIG. 3, the biometric database includes a partition 1, a partition 2, a partition 3, a partition K, A partition R and a partition T. Any one partition includes a plurality of registered biometric data. Recognition algorithms such as an algorithm A, an algorithm B, an algorithm C . . . an algorithm N and the like are integrated in the multi-algorithm platform. The algorithms are configured in this way that the partition 1 and the partition 2 use the algorithm A as a main algorithm and the algorithm B as an auxiliary algorithm; the partition 3 uses the algorithm C as a main algorithm and the algorithm D as an auxiliary algorithm; and the partition K, the partition R and the partition T use the algorithm N as a main algorithm and an algorithm M as an auxiliary algorithm. If the biometric recognition server receives the verification password information 5678 and determines that the partition corresponding to the verification password information 5678 is partition K, recognition computation is performed between the target biometric information and the registered biometric information in the partition K through the main algorithm N, and recognition verification is performed on the recognition result through the auxiliary algorithm M after the recognition result is obtained.

Furthermore, if the quantity of the partition biometric information in a subset (a partition) corresponding to certain verification password information is still large, in order to further reduce the computation amount and relieve pressure of a computer, 'recognizing the registered biometric information matched with the target biometric information from the partition biometric information' in the above content, may specifically include:

an information quantity of the partition biometric information is compared with a quantity threshold value;

the step of recognizing the registered biometric information matched with the target biometric information from the partition biometric information is executed if the information quantity is smaller than the quantity threshold value; and sub-partition biometric information is selected out from the partition biometric information through an algorithm if the information quantity is larger than or equal to the quantity threshold value, and the registered biometric information matched with the target biometric information is recognized from the sub-partition biometric information.

During implementations, after the partition biometric information corresponding to the verification password information is determined from all the registered biometric information, the quantity of the partition biometric information needs to be determined, and the quantity of the partition biometric information is compared with the quantity threshold value. For example, if there are P partition biometric information and the quantity threshold value is 500, P is compared with 500, if P is smaller than 500, the P partition biometric information is directly compared with the target biometric information respectively, and the registered biometric information matched with the target biometric information is searched out from the P partition biometric information; and if P is larger than or equal to 500, it indicates that the quantity of the partition biometric information is still large, the recognition range needs to be further narrowed down. For example, a least recently used (LRU) algorithm may be used, and part of the partition biometric information is selected as the sub-partition biometric information. For example, Q partition biometric information is selected from the P partition biometric information to serve as the sub-partition biometric information, $Q \geq P$. Then, the Q sub-partition biometric information is compared with the target biometric information respectively, and the registered biometric information matched with the target biometric information is recognized from the Q sub-partition biometric information.

In embodiments of the present disclosure, the registered biometric information matched with the target biometric information is determined through a corresponding relation between the verification password information and the registered biometric information, the biometric recognition range may be narrowed down, the recognition computation amount is greatly reduced, and the recognition success rate is increased.

However, if the quantity of the sub-partition biometric information is still large, the probability of failure in the process of recognizing the registered biometric information matched with the target biometric information still exist. In embodiments of the present disclosure, if executing the step of recognizing the registered biometric information matched with the target biometric information fails (namely, there is no registered biometric information matched with the target biometric information), a recognition failure response may be sent to the terminal through the acquirer server, so that the terminal displays a prompt of inputting auxiliary recognition information. A specific implementation process is as follows.

The auxiliary recognition information forwarded by the acquirer server is received. The auxiliary recognition information is sent by the terminal to the acquirer server in response to operation of the user.

Registered biometric information corresponding to the auxiliary recognition information is determined from the sub-partition biometric information through the auxiliary recognition information.

Registered biometric information matched with the target biometric information is recognized from registered biometric information corresponding to the auxiliary recognition information.

The auxiliary recognition information may be last four digits of a mobile phone number of the user, first six digits of an ID number of the user, and the like. There is also a corresponding relation between the auxiliary recognition information and the registered biometric information, namely, one piece of auxiliary recognition information corresponds to a plurality of registered biometric information. If the quantity of the sub-partition biometric information selected out from the partition biometric information through the algorithm is still large, the registered biometric information matched with the target biometric information still cannot be recognized. In this case, the registered biometric information corresponding to the auxiliary recognition information may be found from the sub-partition biometric information corresponding to the verification password information through the auxiliary recognition information, thus on the basis of narrowing down the recognition range through the verification password information and the algorithm, the recognition range may be further narrowed down through the auxiliary recognition information, and the recognition success rate is improved.

For example, if recognition fails, the biometric recognition server sends a recognition failure feedback to the acceptance terminal through the acquirer server, the acceptance terminal prompts the user to input the last four digits of the mobile phone number as the auxiliary recognition information, and thus the recognition range is further narrowed down.

Figure 4:
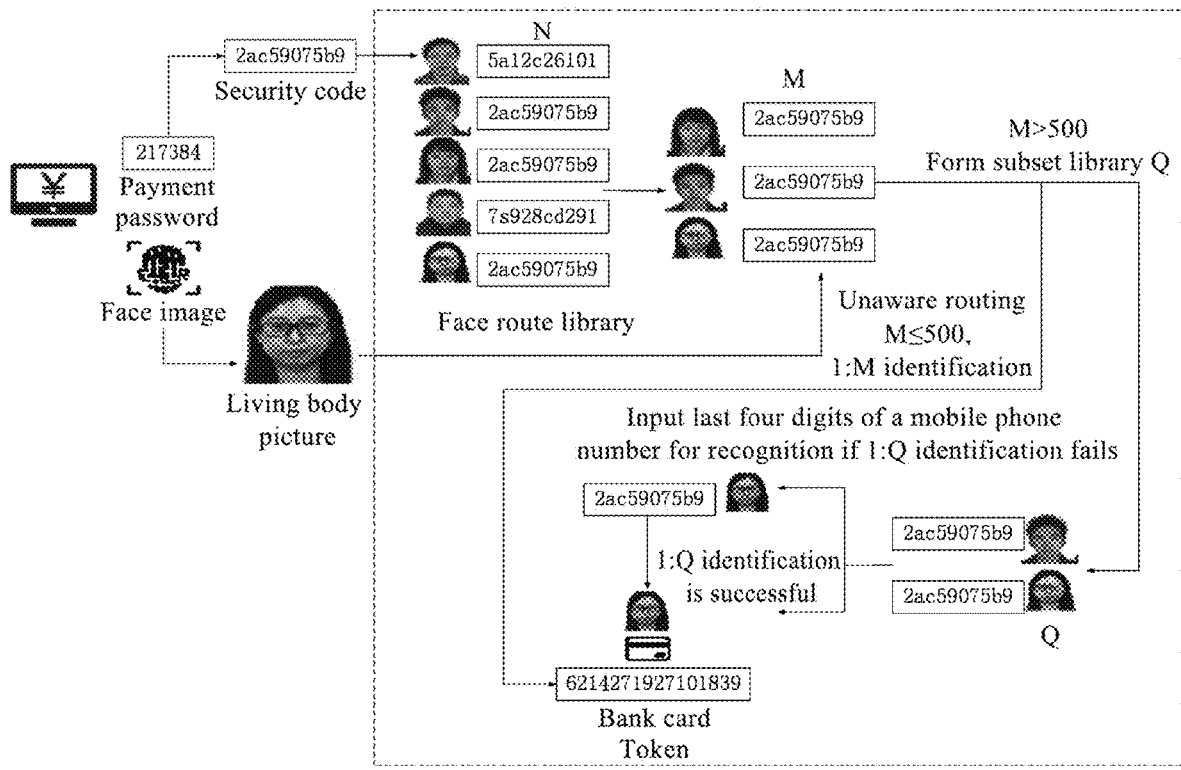
FIG. 4 is a schematic diagram of a process of determining target account information provided by an embodiment of the present disclosure.

FIG. 4 illustrates a process of determining target account information by a biometric recognition server. As shown in FIG. 4, hypothetically, a face image received by the biometric recognition server is a living body picture of the user A, and the payment password is 217384. That is, the target biometric information is the living body picture. The payment password is computed through an irreversible algorithm and then transformed into a security code 2ac59075b9. N face images are stored in a face route library, and M face images corresponding to the security code 2ac59075b9 are determined from the N face images. M is compared with a preset quantity 500, if M≥500, face identification is directly performed between the received living body picture and each of the M stored face images, a face image of the user A is recognized from the M face images, and then a bank card Token of the user A is obtained. If M>500, Q face images are selected out from the M face images through the LRU algorithm, so that a subset library is formed. The Q face images are respectively compared with the received living body picture, if recognition is successful, the face image of the user A is obtained, and then the bank card Token of the user A is obtained. If recognition fails, the last four digits of the mobile phone of the user are obtained so as to further narrow down the recognition range, the face image of the user A is obtained, and then the bank card Token of the user A is obtained.

In order to utilize existing system resources to the maximum degree, in embodiments of the present disclosure, whole transaction is divided into a recognition process and a data processing process. Before the biometric recognition server sends the data processing request to the card issuer server corresponding to the target account information, the method further includes the following operations.

The target account information is sent to the terminal through the acquirer server, so that the terminal sends the data processing request to the acquirer server. The data processing request includes the target account information and the verification password information.

The data processing request forwarded by the acquirer server is received.

During implementations, as for one transaction, the acceptance terminal may send two requests, namely one recognition request and one payment request. For example, the acceptance terminal generates the recognition request in response to the operation of the user and sends the recognition request to the biometric recognition server through the acquirer server. The recognition request includes the target biometric information and the verification information of the user. Then, the acceptance terminal generates the payment request after receiving the target account information sent by the biometric recognition server and sends the payment request to the card issuer server through the acquirer server and the biometric recognition server. The payment request includes the target account information and the verification password information. The biometric recognition server may be a server in a clearing mechanism. As in an existing transaction system, the clearing mechanism server is connected with the card issuer server and data in the card issuer server are synchronous with the clearing mechanism server, thus, this system structure and the processing manner of one transaction and two requests make small change to the existing system, the existing system resources may be utilized to the maximum degree, and any overlaying onto an existing data processing type is allowed, for example, fund transfer, cash withdrawal, pre-authorization and other types of transactions, and no modification is needed.

Figure 5:
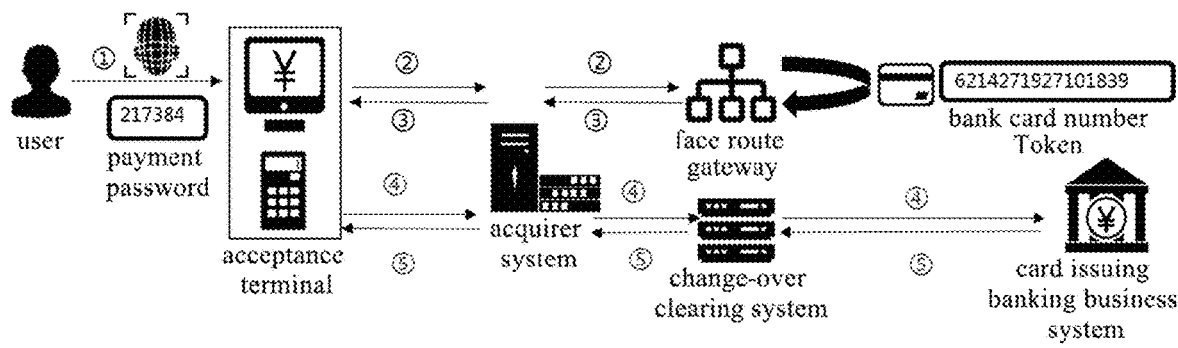
FIG. 5 is a schematic diagram of a data flow direction provided by an embodiment of the present disclosure.

FIG. 5 illustrates a schematic diagram of a data flow direction provided by an embodiment of the present disclosure. As shown in FIG. 5, the acceptance terminal receives the face image and the payment password of the user through step 1, and then the acceptance terminal sends the face image and the payment password to a face route gateway in the clearing mechanism through step 2. The face route gateway determines a bank card number of the user from a face route database and then feeds back a bank card number Token to the acceptance terminal through step 3. The acceptance terminal, based on the received bank card number Token, sends the payment request to a card issuing banking business system through an acquirer system and the change-over clearing system through step 4. The card issuing banking business system feeds back to the change-over clearing system, the acquirer system and the acceptance terminal through step 5 after processing is completed. It can be seen in FIG. 5 that the acceptance terminal sends two requests according to the operation of the user, the user only needs to input his face image and payment password at first, the user does not need to know the middle process, and in this manner, though the acceptance terminal sends the two requests, the operation of the user is concise.

Furthermore, before the biometric recognition server receives the target biometric information and the verification password information of the target object, the method further includes the following operations.

Registered account information, registered biometric information and routing index information of the target object are received. The routing index information is generated by operating the verification password information through an irreversible algorithm.

Salt encryption processing is performed on the routing index information.

Encrypted routing index information, the registered biometric information and the registered account information are stored associatively in a partition corresponding to the routing index information.

During implementations, the user may register through an card issuer APP, or a clearing mechanism (for example, a card scheme) APP, or a third party APP. When the user registers, the registered account information, the registered biometric information and the verification information are obtained.

When the user registers through the card issuer APP, the card issuer server obtains the account information, the face image and the payment password and other registration information of the user and associatively stores the obtained registration information, and the registration information is synchronous with the biometric recognition server. When the user registers through the clearing mechanism APP, the biometric recognition server obtains the account information, the face image, the payment password and other registration information of the user and associatively stores the obtained registration information, and the registration information is synchronous with the card issuer server.

In order to ensure the data security, especially, the security of the verification password information, in embodiments of the present disclosure, the card issuer server operates the verification password information through the irreversible algorithm to generate the routing index information after receiving the verification password information, and the registered account information, the registered biometric information and the routing index information are synchronous with the biometric recognition server. The biometric recognition server performs salt encryption processing on the routing index information of each user so as to ensure the information security. Salt encryption is a data encryption mode, for example, each of data is associated with an n-digit random number called 'salt' for together encryption. The random changes as long as the data change whenever possible. The random number is stored in a file in an unencrypted mode, an encrypted result is also stored in the file. The irreversible algorithm may be SM3, SHA-256 and the like.

Figure 6:
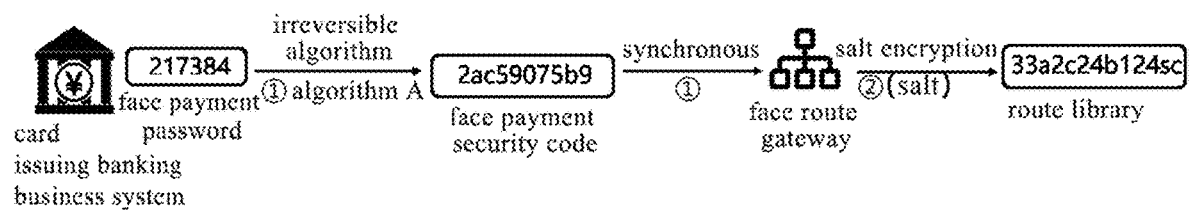
FIG. 6 is a schematic diagram of a registration flow provided by an embodiment of the present disclosure.

FIG. 6 illustrates a registration flow provided by an embodiment of the present disclosure. As shown in FIG. 6, the user sets the payment password in a card issuing bank APP. The card issuing banking business system operates the payment password to a face payment security code through irreversible operation, and then the face payment security code is synchronous with a face route platform. The face route platform adds different salt into each face payment security code and performs encrypted storage.

In order to further ensure the data storage and transmission security, 'the encrypted routing index information, the registered biometric information and the registered account information are stored associatively' in the above content may include the following operations.

Tokenization processing is performed on the registered account information so as to obtain card Tokend information.

The encrypted routing index information, the registered biometric information and the Tokend information are stored associatively.

Correspondingly, determining the target account information of the target object, includes the following operations.

Tokend information corresponding to the target biometric information is determined.

The Tokend information is converted into Tokent information.

Furthermore, after the target account information of the target object is determined, the method further includes: sending the Tokent information to the terminal.

During implementations, in order to prevent leakage of the account information of the user, tokenization processing may be performed on the account information so as to generate Token information. In an optional embodiment, the card Token information may be generated by means of a payment tokenization service (Token service provider (TSP)), the payment tokenization service TSP is a digital payment basic security service and may provide security guarantee for payments of a bank, a payment institution and an industry body. The payment tokenization service TSP uses a specific payment Token to replace a traditional bank card number, thereby effectively reducing the risk of leakage of card information at a merchant and an acceptance institution side and helping to reduce transaction frauds.

Exemplarily, the bank card Token information may include: bank information and information with part of a bank card number. For example, one piece of bank card Token information is: T bank, 6666********1234, part of bank card number in the bank card Token information is replaced with *.

The biometric recognition server may uses the routing index information as an index (may combine a data label, last four digits of the mobile phone number and the like according to conditions) to generate Token information of the account information. The Token information may fall into the Tokend information and the Tokent (temporary) information, the Tokend information is stored in the biometric database, the biometric recognition server tokenizes the Tokend information to generate the Tokent information, and the Tokent information is sent out. The Tokent information is valid only in a period of time, for example, 3 minutes. Therefore, leakage of the account information of the user may be prevented, and the security of assets of the user may be improved.

In embodiments of the present disclosure, the biometric information may include one or a plurality of the following listed items:

face information, fingerprint information, vocal print information, iris information, palm print information, finger vein information or palm vein information.

In an optional embodiment, an acceptance device may perform living body detection on the user after receiving the payment password of the user. The living body detection is used for judging whether the collected biometric information comes from a living body. During living body detection, the user may be required to blink, turn the head, open the mouth and the like. Through the living body detection, other users may be prevented from using a picture of the user to swipe a user's bank card as a fraud, so that the security of the assets of the user is improved.

Figure 7:
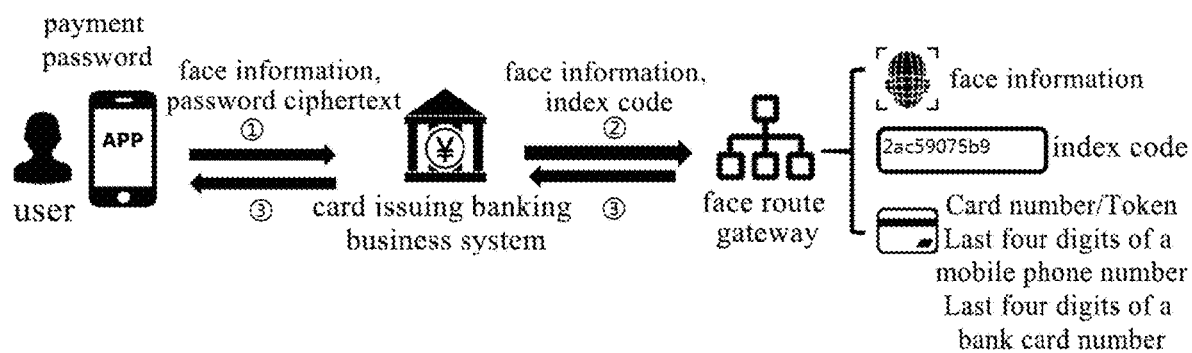
FIG. 7 is a schematic diagram of a registration flow in embodiment 1 of the present disclosure.

In order to more clearly understand the present disclosure, the above flow will be described in detail by using an embodiment. FIG. 7 illustrates a schematic diagram of a registration flow in embodiment 1.

As shown in FIG. 7, in the flow, the user initiates an application of opening a face recognition offline payment transaction through the card issuing bank APP, registers face information, bonds the bank card and sets the payment password.

The card issuing banking business system finishes user identity authentication and makes face route information (a routing index code, the face information, the bank card number/Token, the last four digits of the bank card number and the last four digits of the mobile phone number) synchronous with the face route platform.

The face route platform returns a synchronizing result to the card issuing banking business system, and the card issuing banking business system returns a user registration opening result. The user may perform operations of changing a face picture and the payment password and setting a default payment card.

Figure 8:
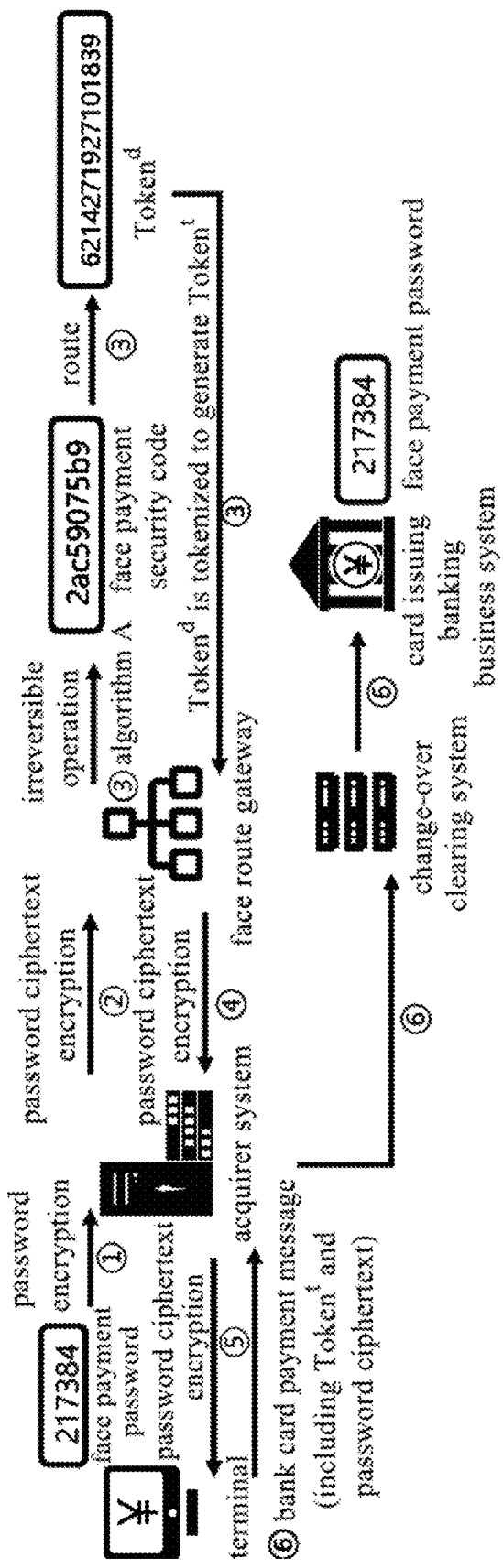
FIG. 8 is a schematic diagram of a payment flow in embodiment 2 of the present disclosure.

FIG. 8 illustrates a schematic diagram of a payment flow in embodiment 2.

As shown in FIG. 8, in the flow, the acceptance terminal collects face information, and prompts the user to input payment password.

The acceptance terminal makes the face information and payment password ciphertext encrypted through the acquirer system and transmits it to the face route platform.

The face route platform encrypts the payment password ciphertext into a routing index code, then performs recognition according to the face information, the routing index code and the like, performs tokenization processing on a payment card number if the recognition is successful, and returns a payment Token to the acceptance terminal.

If the face route platform returns need of adding auxiliary information, an answer-back code corresponding to the acquirer is returned, the terminal recollects the last four digits of the mobile phone number, then sends them up for recognition transaction, and it returns to the terminal if the recognition is successful.

The acceptance terminal initiates an transaction by using the Token and the payment password ciphertext, and transmits a transaction instruction to the card issuing banking business system through the acquirer system and the changeover clearing system.

The card issuing banking business system performs transaction confirmation according to the payment password and a living body detection result, and the payment transaction is completed.

Figure 9:
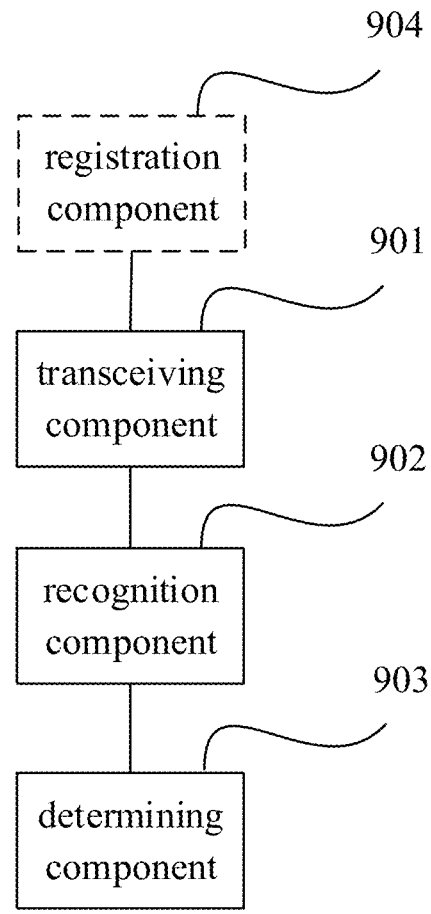
FIG. 9 is a schematic structural diagram of a data processing apparatus provided by an embodiment of the present disclosure.

Embodiments of the present disclosure further provide a data processing apparatus, as illustrated in FIG. 9, including:

a transceiving component 901, configured to receive target biometric information and verification password information of a target object sent by an acquirer server;

a recognition component 902, configured to recognize registered biometric information matched with the target biometric information from registered biometric information of a plurality of objects, wherein registered biometric information and account information of the same object are stored associatively; and a determining component 903, configured to determine target account information of the target object according to the recognized registered biometric information.

The transceiving component 901 is further configured to send a data processing request to a card issuer server corresponding to the target account information. The data processing request includes the target account information and the verification password information, so that the card issuer server performs verification through the verification password information and performs data processing according to the target account information after the verification is passed.

In an optional embodiment, the recognition component 902 is configured to:

determine partition biometric information from the registered biometric information of the plurality of objects, wherein the partition biometric information is registered biometric information stored in association with the verification password information;

determine a main recognition algorithm and an auxiliary recognition algorithm corresponding to the verification password information;

recognize the registered biometric information matched with the target biometric information from all partition biometric information corresponding to the verification password information through the main recognition algorithm; and verify a recognition result of the main recognition algorithm through the auxiliary recognition algorithm.

In an optional embodiment, the recognition component 902 is configured to:

compare an information quantity of the partition biometric information with a quantity threshold value;

execute the step of recognizing the registered biometric information matched with the target biometric information from the partition biometric information if the information quantity is smaller than the quantity threshold value; and select out sub-partition biometric information from the partition biometric information through an algorithm if the information quantity is larger than or equal to the quantity threshold value, and recognize the registered biometric information matched with the target biometric information from the sub-partition biometric information.

In an optional embodiment, the transceiving component 901 is further configured to send a recognition failure response to a terminal through the acquirer server if executing the step of recognizing the registered biometric information matched with the target biometric information fails, so that the terminal displays a prompt of inputting auxiliary recognition information; and receive the auxiliary recognition information forwarded by the acquirer server, wherein the auxiliary recognition information is sent by the terminal to the acquirer server in response to an operation of a user.

The recognition component 902 is further configured to determine registered biometric information corresponding to the auxiliary recognition information from the sub-partition biometric information through the auxiliary recognition information; and recognize the registered biometric information matched with the target biometric information from the registered biometric information corresponding to the auxiliary recognition information.

In an optional embodiment, the transceiving component 901 is further configured to:

send the target account information to the terminal through the acquirer server, so that the terminal sends the data processing request to the acquirer server, wherein the data processing request includes the target account information and the verification password information; and receive the data processing request forwarded by the acquirer server.

In an optional embodiment, the apparatus further includes a registration component 904, configured to:

receive registered account information, registered biometric information and routing index information of the target object, wherein the routing index information is generated by operating the verification password information through an irreversible algorithm;

perform salt encryption processing on the routing index information; and store encrypted routing index information, the registered biometric information and the registered account information associatively.

In an optional embodiment, the registration component 904 is configured to perform tokenization processing on the registered account information so as to obtain Tokend information; and store the encrypted routing index information, the registered biometric information and the Tokend information associatively.

The determining component 903 is further configured to determine Tokend information corresponding to the target biometric information; and convert the Tokend information into the Tokent information.

The transceiving component 901 is further configured to send the Tokent information to the terminal.

In an optional embodiment, the biometric information includes one or a plurality of the following listed items:

face information, fingerprint information, vocal print information, iris information, palm print information, finger vein information or palm vein information.

Figure 10:
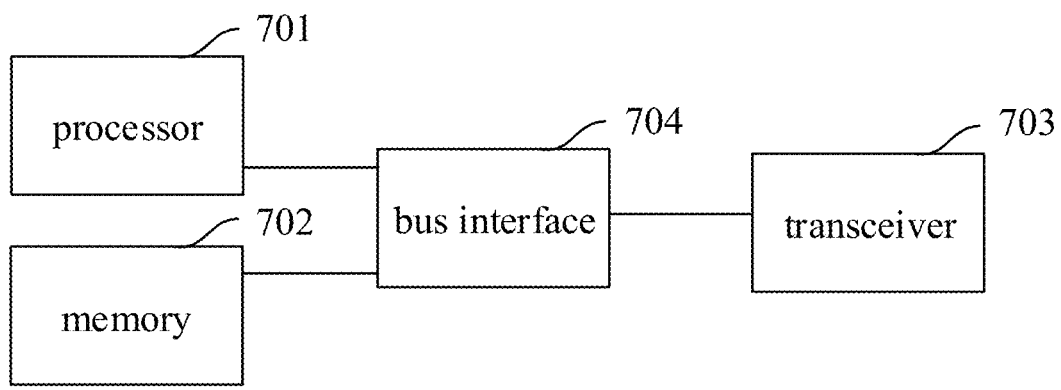
FIG. 10 is a schematic structural diagram of an electronic device provided by an embodiment of the present disclosure.

Based on the same principle, the present disclosure further provides an electronic device, as illustrated in FIG. 10, including: a processor 701, a memory 702, a transceiver 703 and a bus interface (704). The processor 701, the memory 702 and the transceiver 703 are connected through the bus interface 704.

The processor 701 is configured to read program(s) in the memory 702 and execute the following method.

Target biometric information and verification password information of a target object sent by an acquirer server are received.

Registered biometric information matched with the target biometric information is recognized from registered biometric information of a plurality of objects.

Target account information of the target object is determined according to the recognized registered biometric information.

A data processing request is sent to a card issuer server corresponding to the target account information. The data processing request includes the target account information and the verification password information, so that the card issuer server performs verification through the verification password information and performs data processing according to the target account information after the verification is passed.

Based on the same principle, the present disclosure further provides a non-transitory computer-readable storage medium, storing computer instruction(s). The computer instruction(s) is/are configured to make a computer execute the method in any of FIG. 1 to FIG. 8.

The present disclosure is described in reference to flow charts and/or block diagrams of the method, the device (system) and a computer program product according to the embodiments of the present disclosure. It should be understood that each flow and/or each block in the flow charts and/or the block diagrams, and combination of flows and/or blocks in the flow charts and/or the block diagrams may be realized through the computer program instructions. These computer program instructions may be provided for a processor of a general-purpose computer, a special-purpose computer, an embedded processor or other programmable data processing devices so as to generates a machine, so that the instructions executed by the processor of the computers or the other programmable data processing devices may generate an apparatus for realizing specified functions in one or more flows of the flow charts and/or one or more blocks of the block diagrams.

These computer program instructions may be also stored in a computer-readable memory capable of guiding the computers or the other programmable data processing devices to work in a specific mode, so that the instructions stored in the computer-readable memory may generate a product including an instruction apparatus. The instruction apparatus realizes the specified functions in one or more flows of the flow charts and/or one or more blocks of the block diagrams.

These computer program instructions may be also loaded onto the computers or the other programmable data processing devices, so that a series of steps are executed on the computers or the other programmable devices to generate processing realized by the computers, thus the instructions executed on the computers or the other programmable devices provide the steps for realizing the specified functions in one or more flows of the flow charts and/or one or more blocks of the block diagrams.

Though the preferred embodiments of the present disclosure have been described, those skilled in the art can make other changes and modifications for these embodiments once they know a basic inventive concept. In this case, appended claims intend to be constructed as including the preferred embodiments and all the changes and modifications in the scope of the present disclosure.

Apparently, those skilled in the art can make various changes and modifications for the present disclosure without departing from the spirit and scope of the present disclosure. In this case, if these changes and modifications of the present disclosure fall in the scope of the claims and their equivalents, the present disclosure also intends to include these changes and modifications.

What is claimed is:

1. A data processing method, comprising:
receiving target biometric information and verification password information of a target object sent by an acquirer server;
recognizing matched registered biometric information, matched with the target biometric information, from registered biometric information of a plurality of objects, wherein registered biometric information of any of the objects and registered account information of the any object are associatively stored;
determining target account information of the target object according to the matched registered biometric information; and
sending a data processing request to a card issuer server corresponding to the target account information, wherein the data processing request comprises the target account information and the verification password information, so that the card issuer server performs verification through the verification password information and performs data processing according to the target account information after the verification is passed;
wherein the recognizing matched registered biometric information, matched with the target biometric information, from registered biometric information of a plurality of objects comprises:
determining partition biometric information from the registered biometric information of the plurality of objects, wherein the partition biometric information is registered biometric information stored in association with the verification password information;
determining a main recognition algorithm and an auxiliary recognition algorithm corresponding to the verification password information;
recognizing the matched registered biometric information, matched with the target biometric information, from the partition biometric information corresponding to the verification password information through the main recognition algorithm; and
verifying a recognition result of the main recognition algorithm through the auxiliary recognition algorithm.

2. The method according to claim 1, wherein the recognizing the matched registered biometric information, matched with the target biometric information, from the partition biometric information comprises:
comparing an information quantity of the partition biometric information with a quantity threshold value;
recognizing the matched registered biometric information, matched with the target biometric information, from the partition biometric information when the information quantity is smaller than the quantity threshold value;
selecting out sub-partition biometric information from the partition biometric information through an algorithm when the information quantity is larger than or equal to the quantity threshold value, and recognizing the matched registered biometric information, matched with the target biometric information, from the sub-partition biometric information.

3. The method according to claim 2, further comprising:
sending a recognition failure response to a terminal through the acquirer server when it fails to recognize the matched registered biometric information matched with the target biometric information from the sub-partition biometric information, so that the terminal displays a prompt of inputting auxiliary recognition information;
receiving the auxiliary recognition information forwarded by the acquirer server, wherein the auxiliary recognition information is sent by the terminal to the acquirer server in response to operation of a user;
determining registered biometric information corresponding to the auxiliary recognition information from the sub-partition biometric information; and
recognizing the matched registered biometric information, matched with the target biometric information, from the registered biometric information corresponding to the auxiliary recognition information.

4. The method according to claim 1, wherein before sending the data processing request to the card issuer server corresponding to the target account information, the method further comprises:
sending the target account information to a terminal through the acquirer server, so that the terminal sends the data processing request to the acquirer server, wherein the data processing request comprises the target account information and the verification password information; and
receiving the data processing request forwarded by the acquirer server.

5. The method according to claim 1, wherein before receiving the target biometric information and the verification password information of the target object, the method further comprises:
receiving registered account information, registered biometric information and routing index information of the target object, wherein the routing index information is generated by operating the verification password information through an irreversible algorithm;

performing salt encryption processing on the routing index information; and storing encrypted routing index information, the registered biometric information and the registered account information of the target object associatively.

6. The method according to claim 5, wherein the storing the encrypted routing index information, the registered biometric information and the registered account information of the target object associatively comprises:

performing tokenization processing on the registered account information of the target object so as to obtain Tokend information of the target object; and storing the encrypted routing index information, the registered biometric information and the Tokend information of the target object associatively;

the determining the target account information of the target object, comprising:

determining Tokend information corresponding to the target biometric information; and converting the Tokend information corresponding to the target biometric information into Tokent information; and after determining the target account information of the target object, further comprising:

sending the Tokent information to a terminal.

7. The method according to claim 1, wherein the biometric information comprises one or more of:

face information, fingerprint information, vocal print information, iris information, palm print information, finger vein information or palm vein information.

8. A data processing apparatus, comprising:

a transceiving component, configured to receive target biometric information and verification password information of a target object sent by an acquirer server;

a recognition component, configured to recognize matched registered biometric information, matched with the target biometric information, from registered biometric information of a plurality of objects, wherein registered biometric information of any of the objects and registered account information of the any object are associatively stored; and a determining component, configured to determine target account information of the target object according to the matched recognized registered biometric information; wherein the transceiving component is further configured to send a data processing request to a card issuer server corresponding to the target account information, wherein the data processing request comprises the target account information and the verification password information, so that the card issuer server performs verification through the verification password information and performs data processing according to the target account information after the verification is passed;

wherein the recognition component is configured to:

determine partition biometric information from the registered biometric information of the plurality of objects, wherein the partition biometric information is registered biometric information stored in association with the verification password information;

determine a main recognition algorithm and an auxiliary recognition algorithm corresponding to the verification password information;

recognize the matched registered biometric information, matched with the target biometric information, from the partition biometric information corresponding to the verification password information through the main recognition algorithm; and verify a recognition result of the main recognition algorithm through the auxiliary recognition algorithm.

9. The apparatus according to claim 8, wherein the recognition component is configured to:

compare an information quantity of the partition biometric information with a quantity threshold value;

recognize the matched registered biometric information, matched with the target biometric information, from the partition biometric information when the information quantity is smaller than the quantity threshold value; and select out sub-partition biometric information from the partition biometric information through an algorithm when the information quantity is larger than or equal to the quantity threshold value, and recognize the matched registered biometric information, matched with the target biometric information, from the sub-partition biometric information.

10. The apparatus according to claim 9, wherein the transceiving component is further configured to send a recognition failure response to a terminal through the acquirer server when it fails to recognize the matched registered biometric information matched with the target biometric information from the sub-partition biometric information, so that the terminal displays a prompt of inputting auxiliary recognition information; receive the auxiliary recognition information forwarded by the acquirer server, wherein the auxiliary recognition information is sent by the terminal to the acquirer server in response to operation of a user; and the recognition component is further configured to determine registered biometric information corresponding to the auxiliary recognition information from the sub-partition biometric information; and recognize the matched registered biometric information, matched with the target biometric information, from the registered biometric information corresponding to the auxiliary recognition information.

11. The apparatus according to claim 8, wherein the transceiving component is further configured to:

send the target account information to a terminal through the acquirer server, so that the terminal sends the data processing request to the acquirer server, wherein the data processing request comprises the target account information and the verification password information; and receive the data processing request forwarded by the acquirer server.

12. The apparatus according to claim 8, further comprising a registration component configured to:

receive registered account information, registered biometric information and routing index information of the target object, wherein the routing index information is generated by operating the verification password information through an irreversible algorithm;

perform salt encryption processing on the routing index information; and store encrypted routing index information, the registered biometric information and the registered account information of the target object associatively.

13. The apparatus according to claim 12, wherein the registration component is configured to perform tokenization processing on the registered account information of the target object so as to obtain Tokend information of the target object; and store the encrypted routing index information, the registered biometric information and the Tokend information of the target object associatively;

the determining component is further configured to determine Tokend information corresponding to the target biometric information; and convert the Tokend information corresponding to the target biometric information into Tokent information; and the transceiving component is further configured to send the Tokent information to a terminal.

14. The apparatus according to claim 8, wherein the biometric information comprises one or more of:

face information, fingerprint information, vocal print information, iris information, palm print information, finger vein information or palm vein information.

15. An electronic device, comprising:
at least one processor; and
a memory in communication connection with the at least one processor, wherein
the memory stores an instruction capable of being executed by the at least one processor, and the instruction is executed by the at least one processor to perform the method according to claim 1.

16. A non-transitory computer readable storage medium, storing a computer instruction, wherein the computer instruction is executed by a computer to perform the method according to claim 1.

* * * * *